United States Patent [19]

Ivarsson et al.

[11] 4,400,335

[45] Aug. 23, 1983

[54] PROCESS FOR REPAIRING REFRACTORY LININGS

[75] Inventors: Lennart P. Ivarsson, Hoganas; Ingvar G. A. Blom, Nyhamnslage, both of Sweden

[73] Assignee: Höganäs AB, Höganäs, Sweden

[21] Appl. No.: 331,006

[22] Filed: Dec. 15, 1981

[51] Int. Cl.³ .............................................. F27D 1/16
[52] U.S. Cl. ...................................... 264/30; 106/99; 264/59
[58] Field of Search .................... 264/30, 59; 106/99

[56] References Cited

U.S. PATENT DOCUMENTS 3,667,977  6/1972  Harbison .............................. 106/99
3,687,700  8/1972  Blancquart ....................... 264/30 X

*Primary Examiner*—Thomas P. Pavelko
*Attorney, Agent, or Firm*—Quaintance & Murphy

[57] ABSTRACT

The invention relates to a process for repairing hot refractory linings by applying a refractory composition by spraying on to the part of the lining to be repaired. The invention resides in the improvement comprising applying a composition containing an effective amount of combustible elongated channel-forming elements substantially evenly distributed throughout the composition.

9 Claims, No Drawings

PROCESS FOR REPAIRING REFRACTORY LININGS

Industrial furnaces and other facilities for use at high temperatures provided with refractory linings are subject to more or less frequent shut down periods for repair of the lining. The bigger the facility and the longer the shut down period required for a repair, the bigger the fall off in production and thereby the capital loss.

Against this background there is a constant and increasing interest in finding new technique for repairing refractory linings requiring the shortest possible time for the shut down.

Continuous repair of the refractory lining must be provided for in for example steel melting furnaces. Such furnaces, such as of the type arc furnaces, vary in size between 50 and 250 metric tons per charge. The slag zone of arc furnaces is repaired either after each charge or after a number of charges. The refractory material is applied to the hot furnace lining by for example spraying or gunning. Spraying can be performed either by applying refractory mass around the slag zone as a whole or so as to fill up local cavities.

To reduce the shut down period in connection with repair of the shortest possible time the refractory material must be applied to the area of the lining to be repaired while the lining is still hot. Cooling down the whole furnace would be unrealistic in view of the extension of the shut down period such measure would cause. A common problem in spraying the refractory composition or mass onto the hot lining to be repaired is the phenomenon residing in bursting or peeling of the material applied in view of the evaporization of mechanically and chemically bound water contained in the mass. In actual practice this problem is of such a magnitude that gunning or spraying a refractory lining while hot for the purpose of repairing same can be done only with great difficulty and the spraying procedure must be performed repeatedly adding only a thin layer of refractory mass each time.

It is important to note that the possibility of efficiently repairing a refractory lining while it is still hot constitutes a highly desirable and cost-saving procedure, which greatly adds to the economy of the maintenance of refractory linings.

Accordingly, the present invention has for its main object to provide a process enabling the repair of refractory linings while still hot by spraying a refractory composition onto the lining in need of repair.

Another object of the invention is to provide a process using a refractory composition enabling the evaporized water contained therein to escape as through the exposed surface of the composition when applied to the refractory lining to be repaired.

These and other objects of the present invention are attained in a very simple and effective way by applying a refractory composition containing combustible elongated channel-forming elements which are substantially evenly distributed throughout the composition.

Preferred channel-forming elements are based on natural materials originating from plants, such as for example straws or stalks of common cereals, grass, rice roots, fibres from palm trees, needles from pine trees and the like. Since capillary forces are useful for enabling the water to escape from the composition the diameter of the said elements may vary from a few microns up to several millimeters. In practical application of the invention palm tree fibres are highly preferred since said fibres have a small diameter, a high density and are quite rigid. In hot lining repair this type of fibre finds its way easier up to the hot surface then perhaps other materials. In view of its high mechanical strength the palm tree fibre also results in good reinforcement of the composition when applied. (This type of fibre is frequently sold under the commercial name "Bassine").

Alternative materials for the channel-forming elements are prefabricated fibres or tubes made from suitable plastic materials, such as polypropylene. Such materials or elements may be solid having a diameter from some tenths of microns up to a few millimeters, or they may be tubular in shape, such as sucking straws, with a diameter of the order of millimeters, such as from 1 to 5 millimeters.

The channel-forming elements can be used in relatively minor amounts. A preferred proportion of elements lies within the range about 0.05 to 0.5% by weight of the composition as a whole. A preferred range is about 0.1 to 0.3% by weight, such as about 0.2%.

In order to provide for channels in the refractory composition when applied the channel-forming elements shall be elongated, i.e. have a high length/diameter ratio. The length of the elements may vary within very broad limits and a preferred range is from about 5 millimeters to about 10 centimeters. To enable ease in admixing the elements with the rest of the composition it is preferred that the length does not exceed about 5 centimeters, and a particularly preferred range is about 1 to 3 centimeters.

In regard to the composition of the refractory material any commonly used refractory oxides are conceivable. Thus, acid refractory compositions containing mainly $SiO_2$ or $ZrO_2$, any neutral refractory compositions containing mainly $Al_2O_3$ or $Cr_2O_3$ or any basic refractory composition containing mainly $MgO$ or $CaO$ can be used in applying the technique of the invention.

The refractory oxide forms the major part of the composition of the invention and the weight ratio thereof lies suitably within the range about 75 to about 95% by weight of the composition. The composition also contains a minor amount of a binder, such as high alumina cement, phosphoric acid or clay.

Refractory compositions useful in the invention are of a conventional nature and are also usually called gunning mixes, since the mixtures of refractory grains are applied by means of a spray gun. It is preferred to use a minor amount of the binder to aid adherence to the surface of the lining to be repaired. Said gunning mixes are generally finer grained than regular castables consisting of refractory grains and hydraulic binders.

The compositions of the invention are prepared in a conventional manner by mixing the ingredients, such as in a mixing pan containing mixing means, the pan being heated if desired, and the channel-forming elements can be admixed with the rest of the composition at any stage of its manufacture.

To apply the composition containing channel-forming elements onto the lining to be repaired there may be used conventional spray guns, such as Arenco, Besab, Aliwa, Piccola, or a particular spray gun of a rotary type with for example centrifugal action, such as Aliwa, Schleuder.

In practising the present invention it has been unexpectedly found that hot linings can be successfully repaired using the process of the invention in a minimum of time and with a minimum of composition waste. Thus, thick layers of the order of several centimeters can be rapidly built up without water vapour bursting occurring, and this means economic advantages in that significantly short shut-down periods for repair will be required using the technique of the invention.

The invention will in the following be further illustrated by non-limiting examples. In the examples, all percentages are based upon weight if not otherwise stated.

EXAMPLE 1

A high-alumina refractory gunning mix is prepared from the following ingredients:

| | |
|---|---|
| Sintered alumina, −5 mm ($Al_2O_3$) | 85% |
| Clay | 5% |
| High alumina cement CA 25 | 10% |
| Palm tree fiber (Bassine) | 0.2% |

The above ingredients are mixed in a mixer of the type Eirich-mixer to form a gunning mix. The mix is used for hot repair of the lining of a steel melting furnace of the type arc furnace, the repair being performed at a lining temperature of about 1400° C. The spray rate is about 2–5 tons/h and the refractory layer applied has an average thickness of about 10 centimeters. No bursting occurs during applying the gunning mix and very little material waste is formed.

EXAMPLE 2

A basic gunning mix is prepared from the following ingredients:

| | |
|---|---|
| Magnesite, −5 mm | 85% |
| Magnesite, −0.25 mm | 15% |
| $H_3PO_4$ | 4% |
| Chopped barley straw (average length about 2 cm) | 0.25% |

The above ingredients are mixed in a mixer of the same type as that used in Example 1 and the gunning mix obtained is used for repairing the slag zone around the mantle surface of the lining of a steel melting furnace. The spray gun is operated at a flow rate of 200–5000 kgs/h and the lining to be repaired has a temperature varying from about 1450° C. down to about 1100° C. The gunning mix is applied to a thickness of about 10 centimeters. In applying the mix no noticeable vapour bursting occurs and the waste of material is negligible.

EXAMPLE 3

Example 2 is repeated using a semibasic gunning mix prepared from the following ingredients:

| | |
|---|---|
| Olivine, −5 mm | 80% |
| Magnesite, −0.25 mm | 10% |
| High alumina cement | 10% |
| Plastic fibre, diameter ~15 microns, average length ~10 mm | 0.06% |

Similar favourable results as those of Example 2 are obtained.

EXAMPLE 4

Example 2 is repeated using a gunning mix prepared from the following ingredients:

| | |
|---|---|
| Quartzite, −5 mm | 80% |
| Quartzite, 0.25 mm | 15% |
| Clay | 5% |
| Palm tree fibre as in Example 1 | 0.15% |

Similar results as those according to Example 2 are obtained.

It is to be understood that the present invention is not limited to be embodiments illustrated above. Thus, the process of the invention is applicable to repair of any type of refractory lining while hot. The examples given above only constitute preferred embodiments of the invention and equivalents and modifications of the features thereof are obvious to those skilled in the art. Thus, the invention is limited only insofar as the scope of the appended claims is concerned.

We claim:

1. In a process for repairing hot refractory linings by applying a refractory composition by spraying onto the site to be repaired, the improvement comprising applying a composition containing combustible elongated channel-forming elements substantially evenly distributed throughout the composition
   wherein the hot refractory has a temperature greater than that at which the channel-forming elements are combustible.

2. A process according to claim 1, wherein said elements constitute about 0.05–0.5% by weight of the composition.

3. A process according to claim 1, wherein the composition is based on a refractory mass selected from the group comprising acid, neutral and basic masses.

4. A process according to claim 1, wherein said elements consist of palm tree fibres.

5. A process according to claim 1, wherein the composition is applied locally to fill out local cavities.

6. A process according to claim 1, wherein the composition is applied onto the whole worn out surface of the lining.

7. A process according to claim 1, wherein said elements are selected from the group comprising straws and stalks of cereals, rice roots, palm tree fibres, pine needles, plastic fibres and tubes.

8. A process according to claim 7, wherein the length of said elements is within the range about 5 mms to about 10 cms.

9. In a process for repairing refractory linings having a temperature of 1400° C. by applying a refractory composition by spraying onto the site to be repaired, the improvement comprising applying a composition containing combustible, elongated channel-forming elements substantially evenly distributed throughout the composition, said composition being based on a refractory mass of $Al_2O_3$ and having minor amounts of binders, said elements being palm tree fibers having a length of 1 to 3 centimeters and constituting 0.2% by weight of the composition.

* * * * *